June 14, 1966  R. C. BYLOFF ET AL  3,256,244
ALTERNATING CURRENT POWER GENERATING SYSTEM
Filed Oct. 31, 1961  6 Sheets-Sheet 4

INVENTORS:
ROBERT C. BYLOFF,
JOSEPH CHUN,
BY Thomas D. Linton
Attorney.

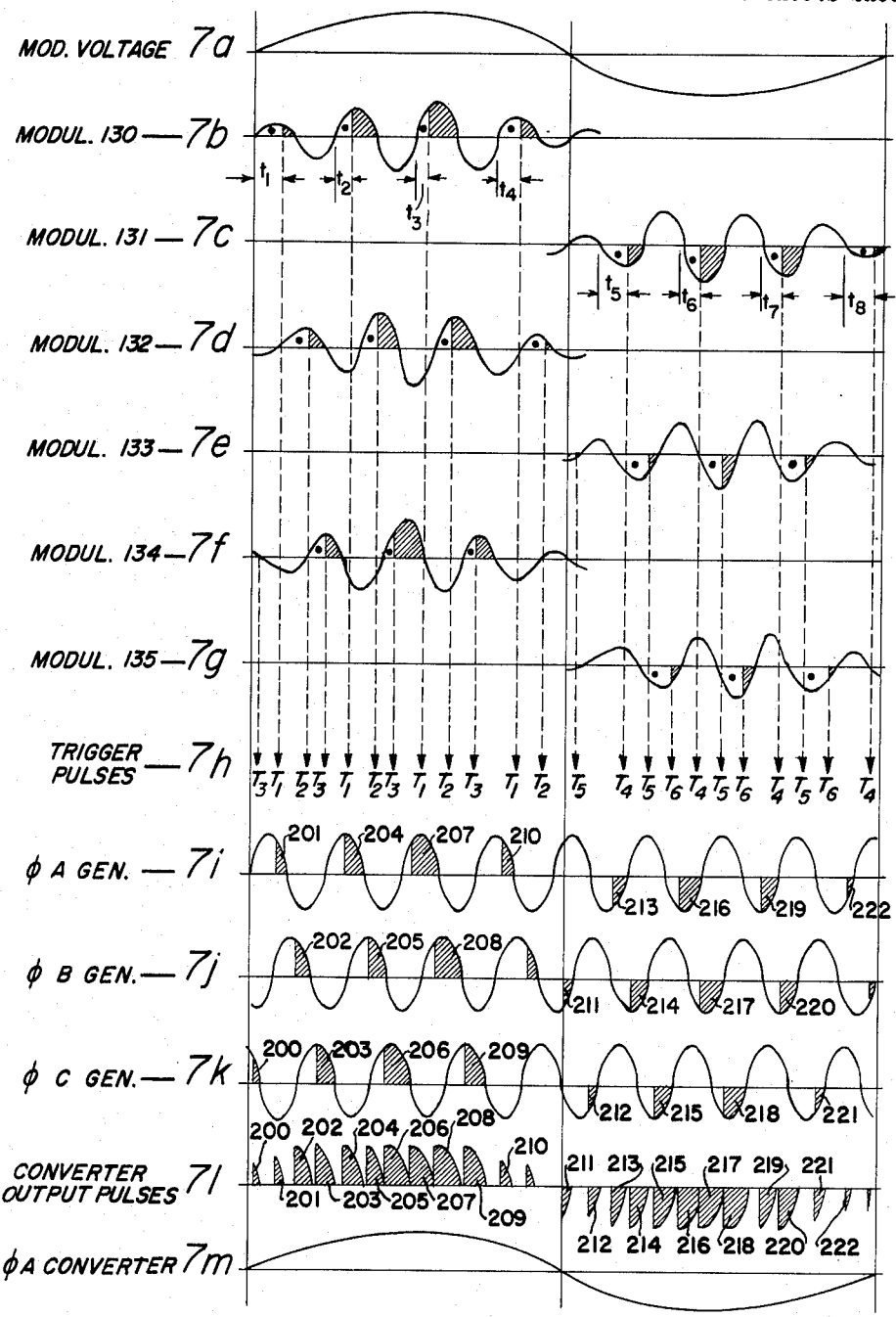

United States Patent Office 3,256,244
Patented June 14, 1966

3,256,244
ALTERNATING CURRENT POWER GENERATING SYSTEM
Robert C. Byloff and Joseph Chun, both of Los Angeles, Calif., assignors to The Garrett Corporation, Los Angeles, Calif., a corporation of California
Filed Oct. 31, 1961, Ser. No. 148,957
17 Claims. (Cl. 321—61)

This invention relates to alternating current power generating systems and more particularly to a system for converting alternating current power of a high and varying frequency to alternating current power of lower, preselected constant or variable frequency.

Generally speaking most alternating current power utilization devices require such power not only at a constant amplitude but also at a constant frequency. Heretofore such constant frequency power was produced from electric generators driven at a carefully regulated constant speed. The frequency of the power determined not only the regulated speed of the electrical generator, but also affected selection of the type of generator. The production of constant frequency power by these methods has several limitations.

One limitation is that the constant speed drive required to provide the constant frequency output power rules out many readily available drives such as, for example, the main propulsion engines of various types of vehicles including sea-going vessels, because engine speed must be varied in order to control the velocity of the vehicle. Consequently, special constant-speed drives for the generator must be provided. These add to the weight, expense and complexity of the power generating system, and require complex speed regulating means necessitating frequent adjustment and maintenance.

Another limitation inherent in the prior art constant frequency power generating systems is the necessity of selecting an electrical generator which can be driven at the speed determined by the desired output frequency instead of a speed determined by the optimum physical and electrical characteristics required for a particular application. It is well known that high speed electrical generators can be made more compact and light-weight than low speed generators, but in prior art power generating systems the practical realization of this advantage was unknown because the generator had to be selected on the basis of tthe desired output frequency.

It is therefore a principal object of this invention to provide a constant frequency power generating system in which the main generator may drive at high variable speeds. More particularly, the principal object of this invention is to eliminate the requirement of a controlled speed drive, and utilize, instead, various existing high variable speed drives for the production of low, constant frequency output power. Concomitantly, another principal object is to facilitate the selection of a generator incorporating optimum features of small size, low weight and simplicity, regardless of the frequency of output power. This will enable the use of high speed generators of lighter weight and compactness than the low speed generators of the prior art.

It is a further object of this invention to provide an alternating current power generating system in which an electrical generator may be driven at high variable speeds, and which provides alternating current power at a constant low frequency.

It is another object of this invention to provide an alternating current power generating system in which the electrical generator may be driven at very high variable speeds to provide high variable frequency output power, and in which the high variable frequency output power is converted into low constant frequency output power.

It is still another object of this invention to provide an alternating current converter for converting high variable frequency input power into low constant frequency output power.

It is still another object of this invention to provide an alternating current power generating system in which the generator may be driven by an existing high variable speed drive, such as the prime mover of a vehicle, to supply alternating current power at a low constant frequency on the order of 60 to 400 cycles per second.

It is still another object of this invention to provide an alternating current power generating system in which the variable high frequency output power is converted to preselected constant low frequency power in accordance with the frequency of a reference signal, and wherein the frequency of the output power changes with the frequency signal of the reference so that by the simple expediency of changing the reference frequency, the output power frequency also changes.

It is still a further object of this invention to provide alternating current power from an alternator driven at high unregulated speed and to convert the frequency of this power to a frequency controlled by a low power, reference signal generator.

In accordance with a preferred embodiment of the alternating current power generating system of this invention, an electrical generator suitable for high speed operation of 48,000 revolutions per minute, for example, is coupled to a prime mover such as the shaft of a gas turbine. The electrical generator may be a homopolar inductor machine which is a brushless alternator in which the rotating part is entirely free of electrical windings, brushes and slip rings. The alternating current output power from this main generator, whether single-phase or poly-phase, is applied to a static (straight-through) frequency converter which "chops up" high frequency output current, and thereby produces, for example, a constant low frequency output current in accordance with the frequency of a reference signal.

The static frequency converter incorporates a plurality of high power silicon controlled rectifiers. The operation of these semiconductor devices is analogous to that of thyratrons. When forwardly biased and suitable trigger or gating pulses are applied, current flows between cathode and anode. When anode-cathode current flow falls below the so-called "hold-current," a condition encountered when the forward bias falls below a characteristic minimum value, the rectifier abruptly ceases to conduct.

Inasmuch as the embodiment described below is a three-phase system, the static frequency converter utilizes three sets of silicon controlled rectifiers. Each of the three sets contains six silicon controlled rectifiers, receives all three phases of the variable-frequency output power from the main generator, and operates in response to trigger pulses to pass selected portions of each component phase of the three-phase main generator output power to a common output terminal. As a result, a composite wave is formed at the output terminal of each set, and these waves constitute the three phases of relatively low frequency output power developed by the system. The trigger pulses for each set of rectifiers are generated in response to a separate phase of a three-phase reference signal having a frequency equal to the desired lower frequency of the system output. Thus, each phase of system output power is synthesized from all three phases of the variable frequency generator output power.

In further detail, the six silicon controlled rectifiers of each set are interconnected to form three paralleled, oppositely-conductive pairs. A first of these pairs is coupled between a first phase of generator output power and a common output terminal. In a similar manner, the second pair is coupled between a second phase of generator output power and the common output terminal, and the third pair is coupled between the third phase of generator output power and the common output terminal.

Accordingly, each of the three aforementioned sets of silicon controlled rectifiers receives as its input all three phases of the varying-frequency output power of the main generator, and utilizing all three input phases, each of the sets synthesizes a separate phase of the three-phase constant-frequency output power of the converter system. Furthermore, synthesization of the converter output waves from the three-phase variable-frequency generator output power is effected by triggering the rectifiers of each set into conduction at the proper time. As described below in further detail, trigger pulses for this purpose are developed in response to a three-phase reference signal equal in frequency to the desired frequency of the system output power. The resultant conduction sequences of the rectifiers permits selected portions of the variable-frequency, three-phase power from the main generator to pass to the respective common output terminals of the three sets where they are combined effectively and thus filtered to form the respective phases of the lower-frequency output power of the converter system.

Each phase of the constant low frequency system output power is made up of substantially equal contributions of all phases of the variable high frequency main generator output power so that the load on the different phases of main generator power is always the same and the main generator is balanced under all operating conditions.

Triggering of the silicon controlled rectifiers is provided by a series of trigger pulses from a trigger circuit means. The times of occurrence of the trigger pulses for various rectifiers is in accord with a function of the desired constant output frequency, the variable main generator frequency, and the desired waveform of the output power.. For the positive half cycle of the converter output power, trigger pulses are generated only for the rectifiers which have positive half cycles from the main generator applied to their anodes, leaving the other rectifiers non-conductive. Furthermore, the time at which the trigger pulses are applied also varies with the envelope of the desired output wave; the greater the amplitude of the envelope, the sooner after the main generator voltage turns positive are the rectifiers triggered, so that more energy is passed before the main generator voltage becomes insufficient to maintain conduction through the rectifiers.

Triggering pulses in accordance with the aforementioned criteria are obtained from a trigger pulse means actuated by a modulator means. The modulator means has applied thereto a three-phase reference frequency signal which determines the system output frequency and provides a portion of the intelligence required for timing the development of trigger-pulses. This, of course, establishes the frequency of the system output power. The three-phase reference signal is modulated with the variable, three-phase high-frequency main generator output frequency to provide a trigger-pulse generator control signal containing intelligence indicating when a particular rectifier is forward biased by the main generator output current.

The trigger circuit is constructed to operate in response to the modulator control, or gating, signal, and to accelerate or retard the occurrence of the triggering pulse in response to increases and decreases in the amplitude of the reference signal. This last item of intelligence is incorporated by utilizing a saturable reactor as a trigger pulse generator, so that a constant amount of energy produces a trigger pulse regardless of the time of application of the modulated signal.

Thus a signal corresponding to the high variable frequency main generator output is amplitude modulated with the low constant frequency signal from a reference generator, and the resultant modulated signal is applied to a saturable reactor means. The saturable reactor means will provide an output pulse whenever it becomes saturated, a condition which depends on the amplitude and frequency of both the reference signal and the signal corresponding to the alternating current generated by the main generator.

Other objects and a better understanding of the invention may be had by reference to the following specification and drawings in which.

Figure 4:
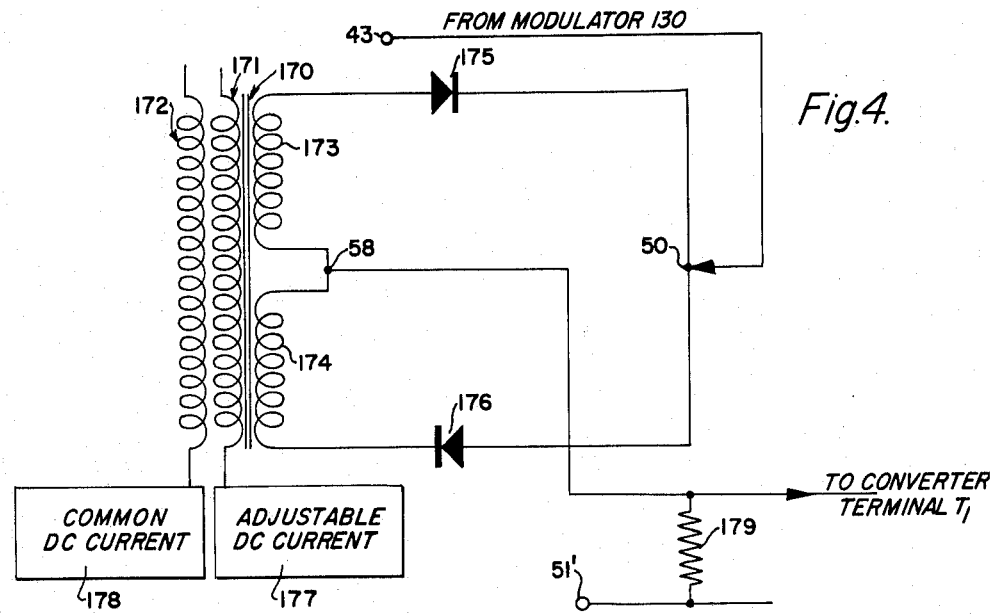
FIG. 4 is a schematic circuit diagram of a saturable reactor trigger circuit for modulator means of FIG. 3.
Figure 6:
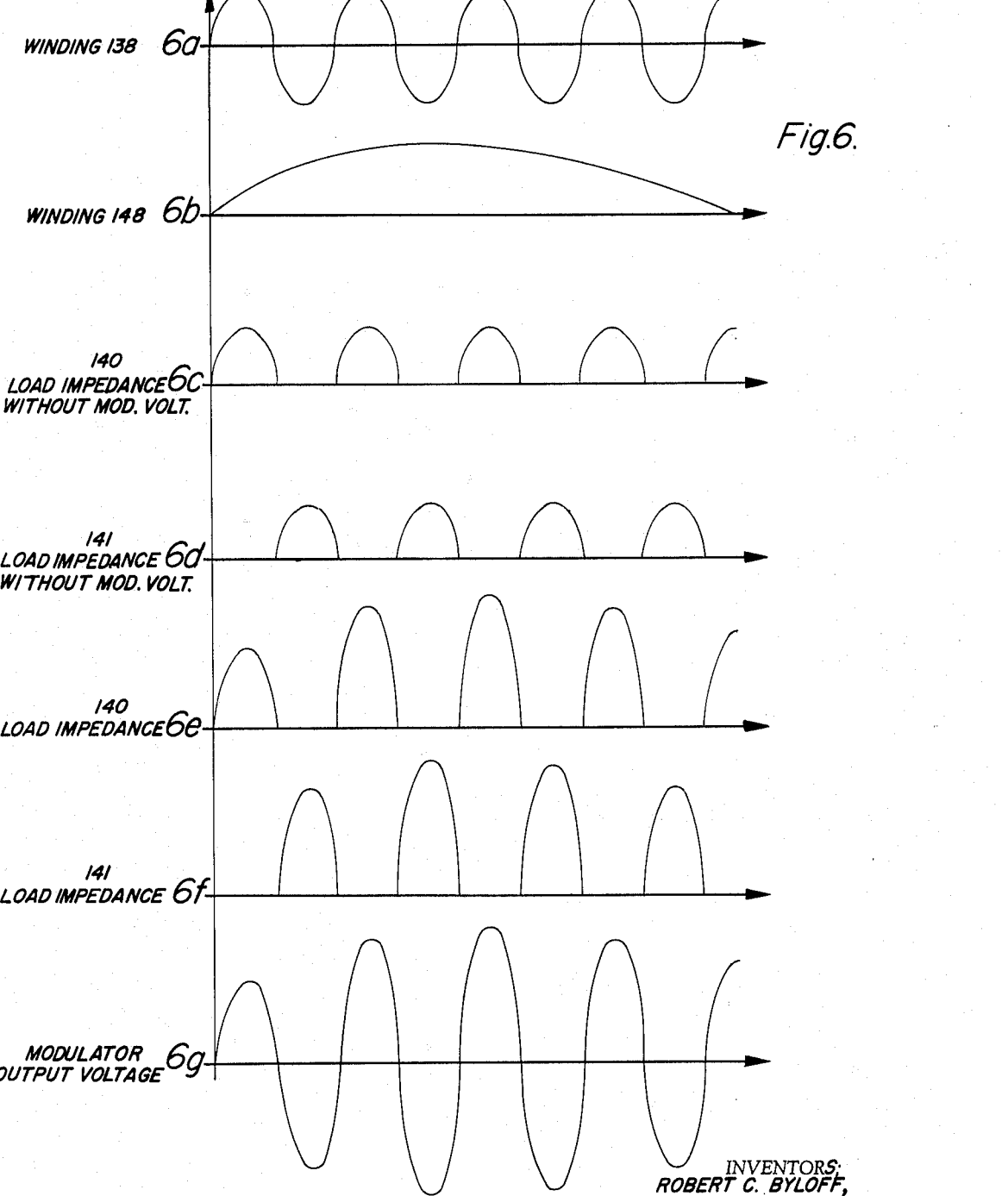

FIG. 6 is a series of voltage-time diagrams useful in understanding the operation of this invention, and illustrating the wave forms of the reference signal, main generator output signals and the amplitude modulated signal applied to the trigger circuit of FIG. 4; and FIG. 7 is a further series of voltage-time diagrams, useful in understanding the operation of this invention, and illustrating the various waveforms of the main generator output power and the generation and timing of the trigger pulses for generating one of the system output phases.

Figure 1:
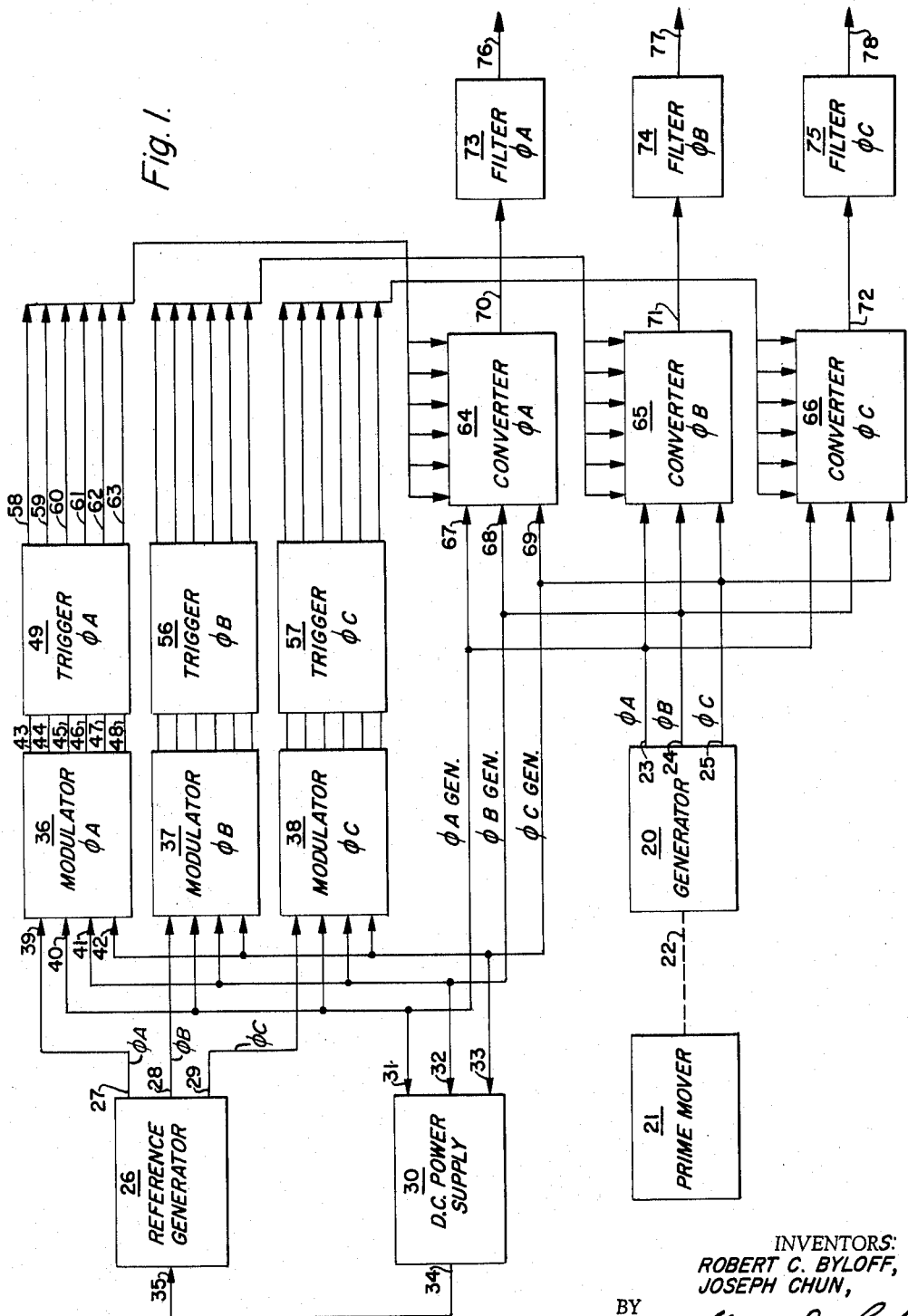
FIG. 1 is a schematic block diagram of a three-phase alternating current power generating system constructed in accordance with the present invention.

Referring now to the drawings, in which like reference characters designate like parts, and particularly to FIG. 1 thereof, there is shown a three-phase power generating system constructed in accordance with this invention. The generating system compris a main generator 20 driven by a prime mover such as a turbine 21 through a suitable mechanical connection such as shaft 22 or a gear train. Since the embodiment of generating system selected for description is a three-phase system, main generator 20 has three output terminals 23, 24 and 25 from which three phases, A, B and C, of alternating current power may be obtained. As is well known, the three phases of the output power differ by 120 degrees from one another. Even though the selected generating system is a three-phase system, the invention is equally applicable to one- and two-phase systems, or for that mtater to any poly-phase system. This will become more evident in connection with the explanation of the operation of this invention.

The particular type of main generator suitable for incorporation into the generating system of this invention depends primarily on the desired power output rating, the permissible weight, size and compactness, and the speed of the particular prime mover available to drive the generator. Generally, the system to be described may utilize any generator (the term generator meaning any kind of moving machinery providing alternating current from mechanical motion) and any prime mover for its successful operation. However, since this invention is of particular importance in providing a source of alternating current power at a constant frequency on ships or other vehicles by utilizing vehicular motive power itself as the prime mover of the generator, it is especially important that the converter system be adapted to lightweight, high speed and compact generators. For example, a power generating system particularly suitable for light-weight installations utilizes a homopolar generator coupled directly to the shaft of the compressor turbine.

This system provides 45 kilowatts of power at a constant output frequency of 400 cycles per second from a homopolar generator having an output frequency varying between 1600 and 4000 cycles per second.

A three-phase reference generator 26 having output terminals 27, 28 and 29 provides a three-phase reference signal at a constant frequency. The frequency of the reference signal, as will be explained presently, controls the frequency of the three phases of output power provided by the frequency-stabilized generating system of this invention. For this reason, the frequency and phase stability of reference generator 26 is of primary importance and must at least be equal to and preferably much greater than the required frequency and phase stability of the system output power.

Reference generator 26 may be supplied with input power from a number of sources; one source particularly useful for a light-weight system is of course the high frequency power output from main generator 20. Accordingly, a conventional direct current power supply 30 (alternating to direct current rectifier) is provided which has its three power input terminals 31, 32 and 33 directly connected to main generator output terminals 23, 24 and 25. Of course, any single one of the three output power phases could ave been utilized, but less filtering is needed by making use of all three phases of output power, and the main generator output power remains perfectly balanced if connected as shown. Since, as has been explained above, the frequency of the generator output power varies, a voltage regulator is usually incorporated into power supply 30 so that direct current power of a constant amplitude is delivered from power supply output terminal 34 to reference generator input terminal 35.

The nomenclature adapted herein in connection with the three-phase system shown in FIG. 1 is as follows: The three phases are respectively identified by the capital letters A, B and C. The source of the alternating current signals are abbreviated GEN for main generator 20, REF for reference generator 26, and CON for the output signals from the system. Both the phase and the source are indicated by subscript to the Greek letter $\phi$ which designates an alternating current signal. Accordingly, $\phi_{B\ GEN}$ refers to the B-phase of alternating current power from main generator 20 and $\phi_{A\ REF}$ refers to the A-phase of the alternating current signal from reference generator 26. Hence, the graphs of FIGS. 7i, 7j and 7k show alternating current power $\phi_{A\ GEN}$, $\phi_{B\ GEN}$, and $\phi_{C\ GEN}$ respectively, and the graph of FIG. 7a shows alternating current signal $\phi_{A\ REF}$ on a common time scale.

All three phases of the alternating current power from main generator 20 and one of the phases from reference generator 26 ($\phi_{A\ GEN}$, $\phi_{B\ GEN}$, and $\phi_{C\ GEN}$, and $\phi_{A\ REF}$) are applied to a $\phi_A$ modulator means 36 which includes, as will be more fully explained in connection with the description of FIG. 3, six individual modulators. Similarly $\phi_B$ modulator means 37 and $\phi_C$ modulator means 38 are provided which have applied thereto, respectively, the B-phase and C-phase of reference generator 26, together with the A, B and C phases of main generator 20. For reference purposes, the four input terminals of $\phi_A$ modulator means 36 are designated 39, 40, 41 and 42 respectively.

Figure 3:
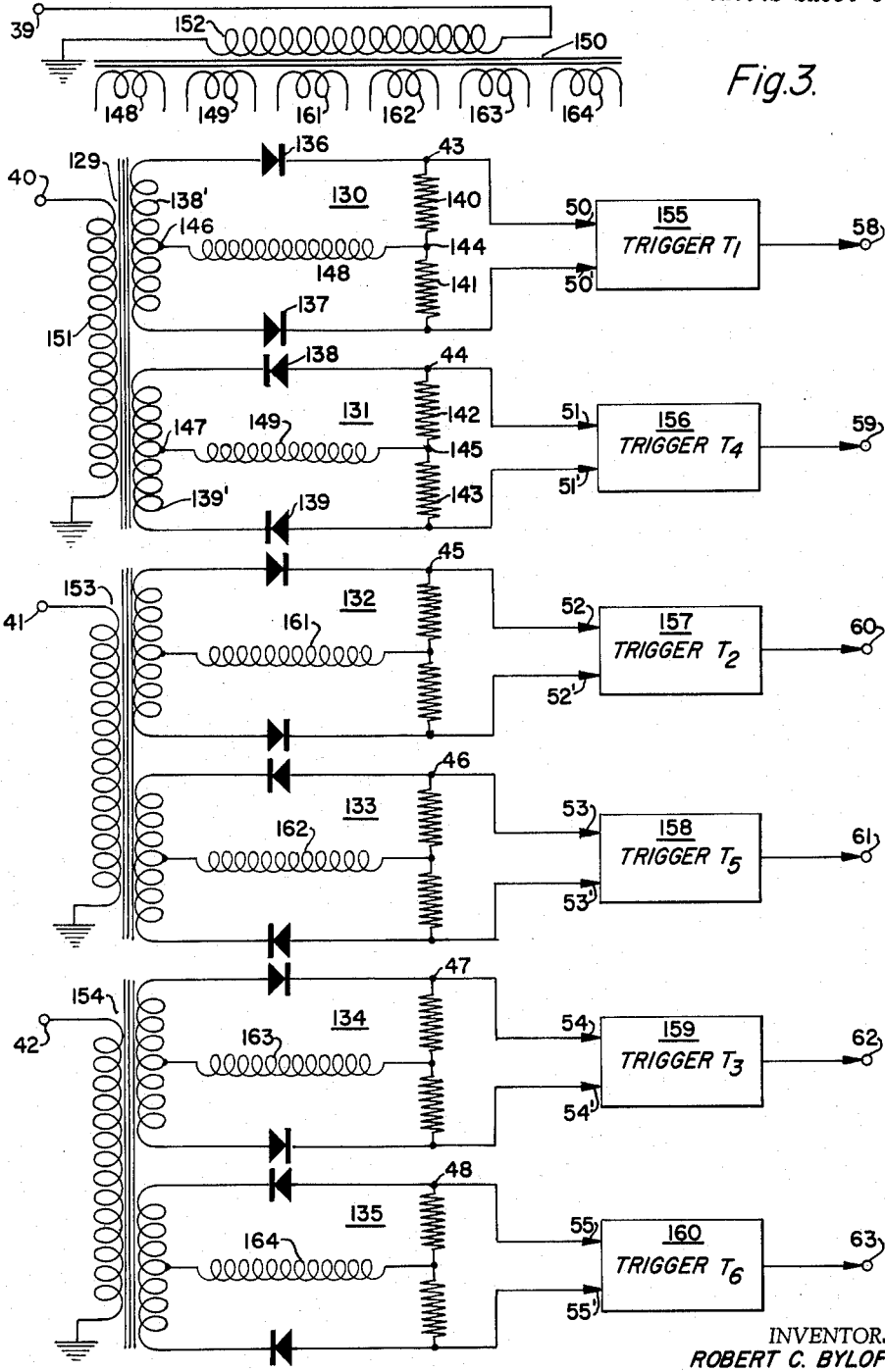
FIG. 3 is a schematic circuit diagram of a modulator means for one of the system output phases of the system of FIG. 1.

The $\phi_A$ modulator means 36 is provided with six output terminals 43, 44, 45, 46, 47 and 48 (from the six individual modulators) each of which is connected to a $\phi_A$ trigger circuit means 49 comprising six individual trigger circuits having input terminals 50, 51, 52, 53, 54 and 55 respectively (shown in FIG. 3). Similarly, $\phi_B$ modulator means 37 is connected to a $\phi_B$ triggering means 56 and $\phi_C$ modulator means 38 to a $\phi_C$ triggering means 57. The triggering means 49 has six output terminals 58, 59, 60, 61, 62 and 63 which provide trigger pulses $T_1$, $T_2$, $T_3$, $T_4$, $T_5$ and $T_6$ respectively (not shown). These trigger pulses are applied to a $\phi_A$ converter means 64 which includes, as will be explained in connection with the description of FIG. 5, six individual silicon controlled rectifiers. Similarly, a $\phi_B$ converter means 65 is controlled by trigger pulses from $\phi_B$ trigger circuit means 56 and $\phi_C$ converter means 66 is controlled by trigger pulses from $\phi_C$ trigger circuit means 57.

Converter means 64, 65 and 66 may be alike in construction and each has applied thereto all three phases of main generator 20. For example, main generator terminals 23, 24 and 25 are connected to $\phi_A$ converter means input terminals 67, 68 and 69, and also to the corresponding input terminals of $\phi_B$ and $\phi_C$ converter means 65 and 66. An output terminal 70 of $\phi_A$ converter means 64 provides the A-phase of the desired output power as shown in the graph of FIG. 7l and 7m. This output phase, as previously indicated, is designated as $\phi_{A\ CON}$ where CON is an abbreviation for converter. Similarly, the B-phase and C-phase of the alternating current output power ($\phi_{B\ CON}$ and $\phi_{C\ CON}$) are obtained for output terminals 71 and 72 of converter means 65 and 66 respectively. In order to provide a smooth output voltage, a sine wave filter, such as $\phi_A$ filter 73 may be connected to terminal 70 for filtering the converter output power to obtain a smooth sinusoidal waveform from lead 76, as shown in the graph of FIG. 7m. Similarly $\phi_B$ and $\phi_C$ filters 74 and 75 are respectively connected to converter means output terminals 71 and 72 to provide the $\phi_{B\ CON}$ and $\phi_{C\ CON}$ phases of output power.

Except as hereinafter indicated, modulator means 36, 37 and 38 are alike, each comprising six individual modulator circuits. Similarly trigger circuit means 49, 56 and 57 are alike each comprising six individual trigger circuits. Also, converter means 64, 65 and 66 are alike each comprising six individually triggered silicon controlled rectifiers. Accordingly, since the individual modulator circuits, trigger circuits and silicon controlled rectifiers are substantially alike (and only subject to different input quantities) the three-phase system of this embodiment has 18 modulators, 18 trigger circuits and 18 rectifiers. As will be better understood as the description of this invention progresses, a two-phase system only requires two modulator means each having four modulator circuits, two trigger circuit means, each having four trigger circuits and two converter means each having four rectifiers. A single-phase system only requires a single modulator means having two modulator circuits, a single trigger means having two trigger circuits and a single converter means having two rectifiers.

Figure 2:
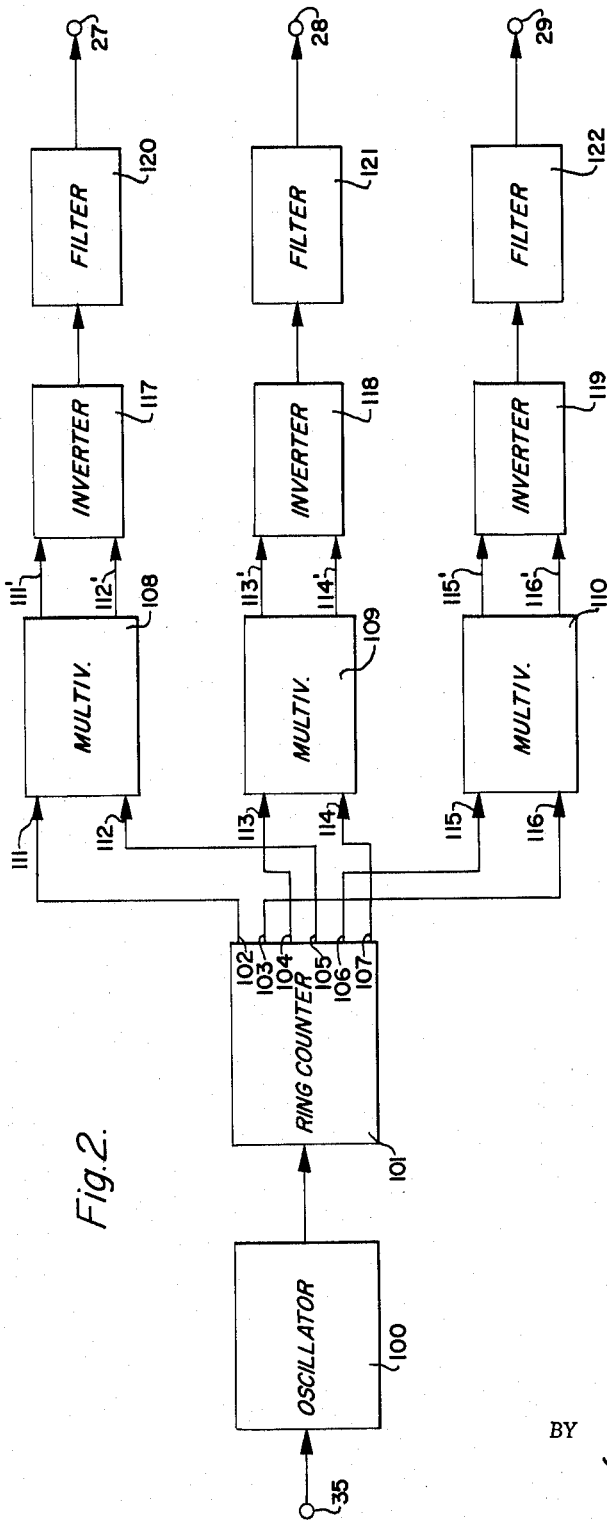
FIG. 2 is a schematic block diagram of elements forming the reference generator portion of the system of FIG. 1.

FIG. 2 shows one embodiment of the three-phase reference signal generator 26 of FIG. 1 useful in practicing this invention. Power is applied to input terminal 35, and the three-phase reference signal ($\phi_{A\ REF}$, $\phi_{B\ REF}$, and $\phi_{C\ REF}$) is produced at output terminals 27, 28 and 29 respectively. As has previously been indicated, and as will become clearer in connection with the explanation of the operation of converter means 64, 65 and 66, the frequency and phase of each output current phase ($\phi_{A\ CON}$, $\phi_{B\ CON}$ and $\phi_{C\ CON}$) will be exactly the same (neglecting a common phase shift) as the corresponding phases of the reference signal. Consequently, it is of the utmost importance that the components of the three-phase reference signal be of stable frequency and are accurately phased with respect to one another. A further desirable feature of reference signal generator 26 is that for certain applications, the frequency is adjustable, so that an electrical power generating system constructed in accordance with this invention may provide output power at a number of different frequencies; for example: 60 cycles and 400 cycles.

Reference signal generator 26 comprises a pulse, sine wave or sawtooth oscillator 100 which may take a variety of forms. For example, oscillator 100 may be a conventional crystal controlled generator, tuning fork generator or a unijunction transistor oscillator tuned to provide an output frequency which is six times the desired output frequency of the alternating current power generating system. For example, if a 400 cycle power generating system is to be constructed, the output frequency of oscillator 100 should be 2400 cycles per second. To obtain a three-phase output, the oscillator output signal is divided by ring counter 101.

Ring counter 101 may comprise a series of six bistable multivibrators (not shown) in a ring arranged so that the output pulse produced by one multivibrator is applied to the second bistable multivibrator, the output pulse of which is applied to the third bistable multivibrator, and so forth. The pulses from oscillator 100 are simultaneously applied to all the bistable multivibrators in ring counter 101 and the individual multivibrators are so inter-related that an incoming pulse will flip a bistable multivibrator unit only if the immediately preceding unit is already on. In other words, only a single multivibrator can be flipped on at each time so that when a new pulse arrives, it turns on the unit immediately following the multivibrator that was previously on. When the sixth pulse arrives it will restore all multivibrators to the initial condition.

Ring counter 101 has six output terminals designated 102, 103, 104, 105, 106 and 107, each of which provides an output pulse in sequence corresponding to the input pulses from oscillator 100. In other words, for every six input pulses applied to ring counter 101, each of output terminals 102 to 107 provides one output pulse in sequence.

Ring counter 101 drives three bistable multivibrators 108, 109 and 110 in such a manner that the output signals from the multivibrators are displaced from one another by 120 degrees. The output signal from each multivibrator, such as multivibrator 108, is a square wave which is obtained by connecting the "high" and "low" output terminals to the opposite ends of a center tapped output transformer to provide a phase inversion of the signal derived from the "low" output terminal.

More particularly, multivibrator 108 includes a "set" terminal 111, a "reset" terminal 112, and output transformer terminals 111', 112'. Terminals 111 and 112 are respectively connected to ring counter terminals 102 and 105. Similarly, the "set" and "reset" terminals 113 and 114 of multivibrator 109 are connected to ring counter output terminals 104 and 107, and the "set" and "reset" terminals 115 and 116 of multivibrator 110 are connected to ring counter output terminals 106 and 103 respectively.

In operation, assuming the start of a new sequence, the first pulse from oscillator 100 provides a pulse at output terminal 102 which "sets" multivibrator 108 thereby turning it on and providing a positive going pulse at transformer output terminal 111'. The second pulse from oscillator 100 initiates a "reset" of multivibrator 110 thereby turning it off so that a positive going pulse is provided on output transformer terminal 116'. The third pulse from oscillator 100 initiates a pulse which sets multivibrator 109 causing a positive going output pulse on output terminal 113'. Since the time separation between the first and the third pulse from ring counter 101 is 120 degrees, the positive going output pulse on output terminals 111' and 113' are also separated by 120 degrees. Similarly, the fifth pulse from terminal 106 initiates the positive going pulse of the third square wave on terminal 115'.

The time separation between phase reversals of the square waves is, of course, 180 degrees. This corresponds to a time interval of three clock pulses. Consequently, the fourth and sixth pulses from ring counter terminals 105 and 107 respectively turn off multivibrators 108 and 109 and initiate a positive going pulse (inverted by the transformer) on transformer output terminals 112' and 114'.

Since the output power of the square waves from multivibrators 108, 109 and 110 is rather low and since the power requirements for modulator means 36, 37 and 38 are somewhat larger than available from these multivibrators, each reference output pulse (square wave) is amplified by conventional inverters 117, 118 and 119 to provide sufficient power to operate the modulators. Output power of approximately 150 watts has been found satisfactory in operating the modulator shown in FIG. 3. The square wave, after being amplified, is applied to a set of wave filters 120, 121 and 122 to convert the square wave into a sine wave. The $\phi_{A\ REF}$, $\phi_{B\ REF}$, and $\phi_{C\ REF}$ are available from output terminals 27, 28 and 29 respectively. Such frequency division as used here has been found to provide very superior phase separation between the three phases and excellent frequency stability.

It has been previously indicated that a direct current power supply 30 is powered by tapping of a small portion of the power delivered by main generator 20. It was also stated that supply 30 includes a voltage regulator to keep the voltage input to reference generator 26 constant. It is likewise within the contemplation of this invention to utilize a voltage regulator incorporated in reference generator 26 for controlling the amplitude of the oscillator output signals. A choice of where to regulate the voltage primarily depends on the type of oscillator being utilized.

Oscillator 100 may be provided in the form of a plug-in unit or a variable frequency oscillator so that a change of reference frequency may be obtainable by exchange or adjustment of oscillator 100. Furthermore, even though three-phase reference generator 26 has been shown and described as incorporating a ring counter for driving a set of multivibrators, it is within the contemplation of this invention to utilize any three-phase generating system suitable for providing three alternating currents having a relative phase displacement of 120 degrees and capable of frequency stable operation.

For a two-phase power generating system constructed in accordance with this invention, oscillator 100 would have to provide a frequency of four times the desired reference frequency and ring counter 101 instead of being a ring-of-six would be changed to a ring-of-four to drive four bi-stable multivibrators. For a single-phase power generating system where there is no need to generate more than a single phase of alternating current, the oscillator may be tuned to provide the proper frequency directly at its output terminal.

As shown in FIG. 3, modulator means 36 of FIG. 1 comprises, as has already been indicated, six separate modulators, 130, 131, 132, 133, 134, and 135. Modulators 130–135 may be grouped into three substantially identical pairs which provide the input signals to a pair of trigger circuits which control the above described pair of rectifiers. These three pairs are respectively 130 and 131; 132 and 133; and 134 and 135. Each pair provides input signals to a pair of trigger circuits which in turn derive trigger signals to trigger the converter means as will presently be explained.

Modulator circuits 130 and 131 are basically a pair of nonlinear amplitude modulator circuits having applied thereto, via a transformer 129, A-phase power from main generator 20 ($\phi_{A\ GEN}$) which will also be referred to as the A-phase carrier voltage. Also applied to modulator circuits 130 and 131 via transformer 150 is the A-phase of the reference signal from reference generator 26 ($\phi_{A\ REF}$) which will also be referred to as the A-phase modulating voltage. The non-linear circuit elements in these modulator circuits are diodes 136 to 139.

In modulator circuits 130 and 131, the anodes of diodes 136 and 137 and the cathodes of diodes 138 and 139 are respectively connected to the end terminals of a pair of secondary windings 138' and 139' of transformer 129. The cathodes of diodes 136 and 137 and the anodes of diodes 138 and 139 are respectively connected to load impedances 140, 141, 142, and 143. The secondary windings 148 and 149 of transformer 150 are connected respectively between center taps 146 and 147 of secondary windings 138' and 139' and junction points 144 and 145. Junction point 144 connects load impedances 140 and 141, and junction point 145 connects load impedances 142 and 143. As will become more evident hereinafter, the diodes connected as described above provide a modulated output signal alternately from modulators 130 and 131 in accordance with the polarity of the applied reference signal.

Transformer 129 has applied thereto, via its primary winding 151, the A-phase alternating current ($\phi_{A\ GEN}$) from main generator 20 which becomes the carrier voltage. The modulating voltage, applied to the primary winding 152 of transformer 150, is the A-phase component of the reference signal derived from the reference generator 26.

Modulators 132 and 134 may be similar to modulator 130, and modulators 133 and 135 may be similar to modulator 131 except that different carrier voltages are applied thereto. As seen in FIG. 3, transformer 153 has applied thereto the B-phase component of power from main generator 20 ($\phi_{B\ GEN}$), and transformer 154 is connected to receive $\phi_{C\ GEN}$ from main generator 20. The modulating voltage to all six modulators 130 to 135 of modulator means 36 is the same, the windings 148, 149, 161, 162, 163, and 164 all being secondary windings of transformer 150.

The operation of modulator 130 can be best understood with reference to the voltage-time graphs of FIG. 6, and by considering secondary winding 138', to which carrier voltage $\phi_{A\ GEN}$ is applied, as the equivalent of two separate high frequency generators connected in series aiding. For this purpose, the portion of winding 138' above center tap 146 forms generator No. 1 and the portion of winding 138' below center tap 146 forms generator No. 2.

In the illustrative example selected and graphically shown, the frequency of the alternating current from main generator 20 (carrier frequency) is four times greater than the frequency of modulating signal $\phi_{A\ REF}$ from reference generator 26. FIG. 6a shows the high frequency carrier signal from primary winding 151, and therefore the output signals of equivalent generators Nos. 1 and 2. The graph of FIG. 6b shows the low frequency modulating signal across secondary winding 148 induced through primary winding 152. Secondary winding 148 may also be regarded as an equivalent generator No. 3.

Assume first that the modulating voltage is equal to zero and that the only voltages applied to modulator 130 are the carrier voltages from generators Nos. 1 and 2. During the first half cycle of the carrier voltage, diode 136 is forward biased, and a current flows through load impedance 140 to center tap 146. During this time interval diode 137 is back biased and does not pass any current so that no output voltage is developed across load impedance 141. The same considerations are applicable during the third, fifth and seventh half-cycles of the carrier voltage. The output voltage developed across load impedance 140 is shown in the graph of FIG. 6c.

When the polarity of the carrier voltage is negative, as during the second, fourth, sixth and eighth half-cycles, diode 137 is forward biased and conducts while diode 136 is back biased and remains nonconductive. During these time intervals, a voltage will be developed across load impedance 141 as shown in the graph of FIG. 6d. The same considerations are applicable to modulator 131 except that the polarity is reversed so that the output voltage across load impedance 142 is shown by the graph of FIG. 6d and the output voltage across load impedance 143 is shown by the graph of FIG. 6c.

Generator No. 3, providing the modulating voltage of FIG. 6b, must now be added to the output voltages. As long as the output voltage of generator No. 3 is positive (that is, center tap 146 is positive with respect to the junction point 144) diodes 136 and 137 are forward biased causing equal current flow through both load impedances 140 and 141 in opposite directions so that the output voltage across both impedances is zero. That is, the voltages developed by generator No. 3 across impedances 140 and 141 cancel. The effect of generator No. 3 is two-fold, first it back biases diodes 138 and 139 of modulator 131 beyond cutoff so that for all practical purposes, modulator 131 is inoperative and secondly, it modulates the current flow in modulator 130 due to the carrier voltage in both load impedances. In fact, during the first half cycle of the carrier voltage, the modulating current is added to the carrier current flowing through impedance 140 and during the second half cycle of the carrier voltage the modulating current is added to the carrier current flowing through impedance 141. This is graphically depicted in FIGS. 6e and 6f which show respectively the output voltages developed across impedances 140 and 141. The output voltage obtained across the combined load impedances 140 and 141 is shown in the graph of FIG. 6g. It is this modulated signal that is applied to trigger circuit input terminal 50. This modulated signal is also referred to as the positive modulation signal since it is modulated by the positive half cycle of $\phi_{A\ REF}$.

During the negative half cycles of $\phi_{A\ REF}$, modulator 130 is inoperative and modulator 131 provides a modulated output signal. Of course, in order for $\phi_{A\ REF}$ to control the operation of modulators 130 and 131, its amplitude must be large enough to overcome the carrier voltage output from the pair of series aiding generators Nos. 1 and 2. As will be seen in connection with the description of the trigger circuit of FIG. 4, even if there is a small output voltage at the beginning and end of the half-cycle during which the modulating voltage is to bias the respective diodes beyond cutoff, this output voltage will be of insufficient amplitude to saturate the saturable reactor which provides the trigger pulses. Consequently these output voltages of the modulator may be disregarded. FIGS. 7b to 7g show small modulator output voltages which have no effect upon the operation of the trigger circuits.

The modulated output voltages obtained from $\phi_A$ modulator means 36 are shown in several graphs of FIG. 7 on a common time base. FIG. 7a shows the full cycle of ($\phi_{A\ REF}$ from reference signal generator 26. FIG. 7b shows that the modulated output voltage from modulator 130 has a frequency determined solely by $\phi_{A\ GEN}$ the A-phase component of output power from main generator 20, and that the amplitude of successive half cycles of $\phi_{A\ GEN}$ are amplitude modulated by the positive portion of $\phi_{A\ REF}$, FIG. 7a. As $\phi_{A\ REF}$ changes polarity the diodes of modulator 130 become biased beyond cutoff, and the modulator output voltage (FIG. 7b) becomes zero. FIG. 7c shows that the output voltage of modulator 131 is zero when modulating reference signal $\phi_{A\ REF}$ is positive, and has a voltage-time characteristic similar to the amplitude modulated wave of FIG. 7b when $\phi_{A\ REF}$ is negative.

Similarly, the output voltages from modulators 132, 133, 134 and 135 are shown respectively by the curves of FIGS. 7d, 7e, 7f and 7g. Since the same reference signal ($\phi_{A\ REF}$) constitutes the modulating voltage in all modulators 130 to 135, the amplitude-time characteristic of the envelope of the modulated output voltages is the same, but the relative phase relationship between the various cycles depends on the phase relationship of the carrier voltages. Accordingly, since the output voltages from modulators 131 and 133 are derived from the B-phase component of output power ($\phi_{B\ GEN}$) of main generator 20, the phase difference between carrier portions of these output voltages and the ones from modulators 130 and 131 is 120 degrees. The same phase difference exists between the carrier portions of the output voltages shown in FIGS. 7d, 7e and 7f, 7g.

The modulated output voltages from the six modulators making up the $\phi_B$ modulator means 37 and the $\phi_C$ modulator means 38 are identical in all respects to the output voltages shown in FIGS. 7b to 7g except that the former are displaced in phase by 120° from each other and from the output voltages of modulator means 36. This phase difference is attributable to the phase difference between the A, B and C-phase of the three-phase reference signal developed by reference generator 26.

It is perhaps worthwhile to point out at this time that the modulator output voltages are zero during alternate half cycles of the three-phase, constant frequency reference signal. Furthermore, no matter how much the frequency of the main generator output varies, the modulated output voltages only subsist during alternate positive or negative half cycles of the applied reference signal. This insures that the converter output frequency will be constant regardless of the frequency of the main generator.

The respective output voltages from the modulators are applied to associated trigger circuits 155, 156, 157, 158, 159, and 160 which provide timed trigger pulses of sufficient amplitude to gate the silicon controlled rectifiers of converter means 64, 65 and 66. As will be explained more fully hereinafter, high current silicon controlled rectifiers are three junction semiconductor devices commerically available for power control and power switching applications requiring, in certain instances, blocking voltages up to 600 volts, and load currents up to 110 amperes direct current. The triggering or gating of such rectifiers can be accomplished with a gate current of less than 70 milliamperes. It is to be understood, however, that the particular embodiment of the trigger circuits described below for gating silicon controlled rectifiers is likewise applicable for gating or triggering other types of gate controlled conduction means, assuming proper adjustment of the amplitude of the trigger or gating pulse being made.

Basically, the trigger circuits of this invention are volt-second devices. In the preferred embodiment of the trigger circuit utilized in connection with this invention, a saturable reactor is employed to provide trigger pulses upon saturation. Briefly, a saturable reactor is an adjustable inductor in which the current versus voltage relationship is adjustable by control of the magnetomotive forces applied to the core of magnetic material. Saturation, or the maximum magnetization of which a saturable reactor, such as a magnetic amplifier, is capable is constant and depends only on the energy (voltage-seconds) supplied thereto.

Trigger circuit 155 (FIG. 3) which saturates at a predetermined level and which has been found eminently useful in practicing this invention is shown in detail in FIG. 4. It comprises basically a saturable reactor 170 having a pair of control windings 171 and 172, and a pair of load windings 173 and 174. The load windings 173 and 174 are connected to one another at junction point 58 which also provides the trigger circuit output terminal for a trigger pulse T. The ends of load windings 173 and 174 are connected respectively to the anode of diode 175 and the cathode of diode 176. The cathode of diode 175, the anode of diode 176 and the output circuit of the associated modulator are connected to junction point 50. The structure and operation of the saturable reactor circuit shown in FIG. 4 are well known to those skilled in the art and form no part of this invention.

Briefly, the principle of operation of the trigger circuit of FIG. 4 is that below saturation of reactor 170, windings 173 and 174 provide a high impedance (in accordance with Lenz's law), and upon saturation the impedance of windings 173 and 174 becomes very small. As soon as the winding impedance becomes small the applied voltage gives rise to a large current in the form of a positive going trigger pulse T. The energy necessary to saturate reactor 170 is constant for a given bias, and is adjustable by changing the bias applied to control windings 171 and 172. The trigger circuit is said to "fire" upon saturation. The energy necessary to "fire" the circuit is constant and is supplied by the modulator output voltage. A measure of the energy of the modulation output voltage is the time-second area of its voltage time characteristic. Since the time scale is also a phase angle scale, the time of firing, referred to as the "firing angle" of the circuit, will vary with the amplitude of the applied modulator output voltage.

In a preferred embodiment, each trigger circuit is provided with a separate bias control in the form of an adjustable direct current voltage source 177 connected to bias winding 171. Source 177 is then adjusted so that it saturates when a preselected amount of energy is applied to terminal 50. All other trigger circuits are similarly biased to saturate with the same amount of energy supplied thereto. Control winding 172 and similar control windings in the other trigger circuits are preferably connected to a common adjustable direct current source 178. The reason for providing a common source for the control windings is to enable an operator to simultaneously change the amount of energy required for saturation and thereby the firing angle of all trigger circuits. This enhances the versatility of the system. A common firing angle control is particularly useful for systems in which the frequency of the output power is varied under the control of a variable-frequency reference signal.

Trigger circuits 156 to 160 (FIG. 3) are like the trigger circuit 155 shown in FIG. 4, each one providing a trigger pulse T upon saturation and each being adjusted to saturate in response to modulator output signals of equal energy content. The timing of the various trigger pulses T produced by $\phi_A$ trigger means 49, that is trigger circuits 155 to 160, is depicted in FIG. 7h on a common time scale with the applied modulated voltages of FIGS. 7b to 7g. Trigger circuit 155 has applied thereto the modulated voltage shown in FIG. 7b, and develops in response thereto trigger pulses $T_1$. Trigger circuit 155 is biased by proper adjustment of bias winding 171 and control winding 172 to reach saturation when the energy applied thereto corresponds to the time-second area under the portion of the first half cycle sine wave of FIG. 7b identified with a dot placed therein. All other areas having a dot placed therein correspond in energy content to this area.

Upon saturation, the current in trigger circuit 155 suddenly rises due to the decrease of the impedance of windings 173 and 174, and the leading edge of a positive going pulse appears at output terminal 58. The instants of time at which the leading edges of trigger pulses $T_1$ are generated is depicted in FIG. 7h. The time $t_1$ from the crossover point at the beginning of positive half cycles of curve 7b represents the firing angle. After the time $t_1$ and until the positive half cycles drop back to zero trigger circuit 155 remains saturated as shown by the shaded area under the voltage time characteristic depicted in FIG. 7b. The negative half cycles of curve 7b are not utilized in the generation of trigger pulses.

During the third half cycle of the modulator output voltage depicted in curve 7b, and after energy corresponding to the dotted area is applied to the trigger circuit, the leading edge of a new positive going pulse $T_1$ is obtained. Again the shaded portion under the voltage-time characteristic represents the unsaturated period of trigger circuit 155. It is of interest to note that the firing angle $t_2$ is smaller than firing angle $t_1$ since the greater amplitude of the second positive cycle causes the energy necessary for saturation to be fed into trigger circuit 155 faster. The triggering pulse $T_1$ obtained from the third half cycle is shown as the third vertical line identified by reference character $T_1$.

Similarly, the leading edges of the trigger pulses $T_1$ generated by the third and fourth positive cycles of the applied modulated voltage are shown and have respectively firing angles $t_3$ and $t_4$. Since the third positive cycle is of larger amplitude than the second positive cycle, the firing angle $t_3$ is smaller than the firing angle $t_2$. The fourth positive cycle has an amplitude lying between that of the first and second positive cycles and consequently the firing angle $t_4$ is smaller than $t_1$ but larger than $t_2$.

It is also noteworthy that the small fifth positive cycle shown has insufficient energy to saturate trigger circuit 155. Hence, it is not absolutely necessary that the output voltage of the modulator fall to zero upon a change of polarity of the modulating voltage. Consequently, it is unnecessary to establish the proper crossover point with exactitude.

It is therefore seen that successive trigger pulses $T_1$ are provided by trigger circuit 155, each one having a position on the time axis corresponding to the amplitude and carrier frequency of the modulated voltage shown in FIG. 7b. The greater the amplitude of the modulator output voltage the greater the voltage time area and the earlier will be the occurrence of the leading edge of the trigger pulse. Since the carrier frequency was assumed, for the purpose of this illustrative example, to be eight times the modulating frequency of the reference signal, there will be four positive pulses $T_1$ from the positive portion of $\phi_{A\,REF}$ and four positive pulses $T_4$ from the negative portion. The pulses $T_4$ are obtained from trigger circuit 156 having applied thereto the modulator output wave shown in FIG. 7c.

The same consideration will show that the trigger pulses $T_2$ from trigger circuit 157 and trigger pulses $T_5$ from trigger circuit 158 are provided by applying thereto the modulator output signals shown in FIGS. 7d and 7e. Likewise, trigger pulses $T_3$ and $T_6$ are provided by trigger circuits 159 and 160 having applied thereto the modulator output signals shown in FIGS. 7f and 7g.

Since the modulator output voltages shown in FIGS. 7d and 7f are obtained by modulating the B-phase and C-phase of the main generator output voltages, the positive cycles of the modulator output voltages are displaced by 120 degrees. Consequently, the leading edges of the trigger pulses $T_2$ and $T_3$ will likewise be displaced with respect to one another and pulses $T_1$ by approximately 120 degrees. The reason for stating that the displacement is only approximately 120 degrees is, of course, due to the variation in firing angle with change of amplitude. For example, trigger pulse $T_3$ generated by the second positive cycle of the wave shown in FIG. 7f is displaced from trigger pulse $T_2$ generated by the first positive cycle of the wave shown in FIG. 7d by 120 degrees minus the difference in firing angle $t_5-t_6$. The firing angle $t_6$ is smaller than $t_5$ because the amplitude of the modulator output voltage is larger.

FIG. 7h shows all four pulses from each of trigger circuits 155 to 160 on a common time scale. The total number of pulses is six times four, that is, 24 trigger pulses for one cycle of the reference signal. Of course, this number varies directly with the frequency of the carrier voltage. Consequently, any change in the main generator frequency produces a corresponding change in the number of trigger pulses generated during one cycle of the reference signal.

Relating the trigger pulses to the output terminals shown in FIG. 3, pulse $T_1$ appears on terminal 58, pulse $T_2$ on terminal 60, pulse $T_3$ on terminal 62, pulse $T_4$ on terminal 59, pulse $T_5$ on terminal 61, and pulse $T_6$ on terminal 63.

It can be shown that for the particular modulator and trigger circuits of FIGS. 3 and 4, the relationship between the firing angle and the reference signal envelope is given by the expression $$\cos \theta = 1 - K/\sin \omega t$$

where $\theta$ is the firing angle measured from the initial crossover point of each positive half cycle of the modulator output voltage, $\omega$ is the angular velocity of the reference signal envelope, $t$ is the time measured from the initial crossover point of positive half cycles of the modulator output voltage, and K is a constant depending on the volt-second capacity of the saturable reactor, the angular velocity of the carrier voltage, and the amplitudes of the carrier and modulating reference-signal voltages.

This equation shows that the firing angle varies sinusoidally with the reference signal envelope, being a minimum when the amplitude of the reference signal envelope is a maximum and increasing as the amplitude of the reference signal envelope decreases. The advantages of such a variation of the firing angle will become clearer in connection with the explanation of the converter means and the chopping action thereof to construct the constant low frequency output power.

Figure 5:
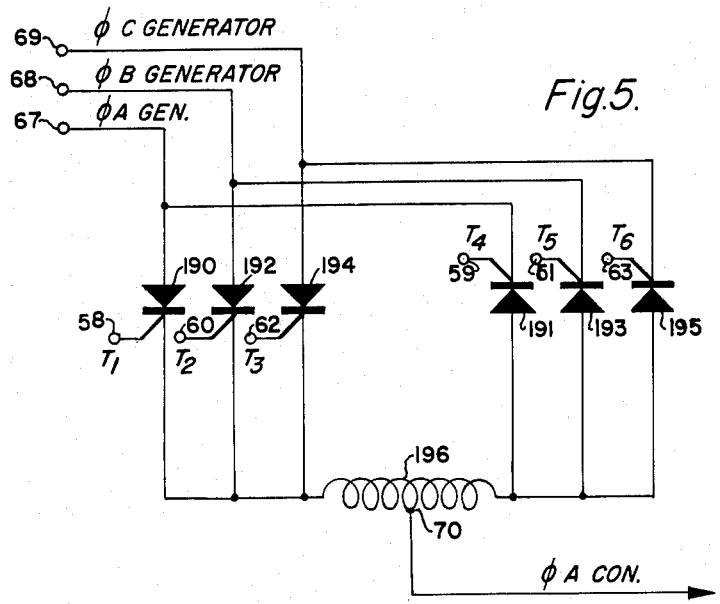
FIG. 5 is a schematic circuit diagram of a converter means for one of the system output phases of the system of FIG. 1.

The $\phi_A$ converter means 64 of FIG. 1 shown in greater detail in FIG. 5 comprises six silicon controlled rectifiers 190 to 195 connected to converter means input terminals 67, 68 and 69 in such a manner that each input terminal is connected to the cathode of one and the anode of another of a pair of rectifiers. For example, input terminal 67, to which the A-phase component of output power from main generator 20 is applied, is connected to the anode of rectifier 190 and the cathode of rectifier 191. Similarly, input terminal 68, to which the B-phase component is applied, is connected to the anode and cathode of rectifiers 192 and 193, respectively. Remaining input terminal 69 is connected to the anode and cathode of rectifiers 194 and 195 respectively. The remaining anodes and cathodes of rectifiers 190 to 195 are respectively connected to opposite ends of a smoothing coil 196 center tapped at 70. Tap 70 provides the converter output terminal for $\phi_{A\,CON}$, the phase-A component of the low, constant frequency output power of the converter system.

Converter means 65 and 66 (FIG. 1) may be similar in construction to converter means 64 as shown in FIG. 5 except that the various rectifiers will be triggered by trigger means 56 and 57 respectively so that output terminals 71 and 72 (FIG. 1) provide the $\phi_{B\,CON}$ and $\phi_{C\,CON}$ components of the converter output power.

The theory of operation of the converter shown in FIG. 5 is based on chopping up the high frequency alternating currents from the main generator to produce a series of positive pulses during the positive half cycle of the reference signal voltage $\phi_{A\,REF}$, and a series of negative pulses during the negative half cycle. The rectifiers are permitted to conduct at predetermined times in proper sequence as determined by trigger pulses $T_1$ to $T_6$. More particularly, $\phi_{A\,GEN}$, $\phi_{B\,GEN}$, and $\phi_{C\,GEN}$ from main generator 20 are applied respectively to converter means input terminals 67, 68, and 69. In the absence of any triggering pulses, no current flows to junction point 70 since all rectifiers are nonconductive unless properly triggered while forwardly biased.

Upon application of trigger pulse $T_1$ to rectifier control terminal 58, rectifier 190 is gated "on" and, provided that the main generator voltage $\phi_{A\,GEN}$ forward biases rectifier 190, a current will flow to terminal 70. A silicon controlled rectifier becomes nonconductive when the amplitude of the current flowing therethrough drops below the so-called hold current. Consequently near the end of each half cycle of $\phi_{A\,GEN}$, $\phi_{B\,GEN}$ and $\phi_{C\,GEN}$ the voltage will become insufficient to maintain a current above the hold current, and conduction will cease. Trigger pulses $T_2$ and $T_3$ are respectively applied to converter means control terminals 60 and 62, and trigger pulses $T_4$, $T_5$ and $T_6$ are respectively applied to converter means control terminals 59, 61 and 63.

Representative waveforms for $\phi_{A\,GEN}$, $\phi_{B\,GEN}$, and $\phi_{C\,GEN}$ as applied to the various rectifiers are shown in FIGS. 7i, 7j and 7k. Current having the waveform of FIG. 7i is applied to rectifiers 190 and 191. Current waveform corresponding to FIG. 7j is applied to rectifiers 192 and 193, and a current waveform corresponding to FIG. 7k is applied to rectifiers 194 and 195.

Referring now to the time sequence of trigger pulses $T_1$ to $T_6$ shown in FIG. 7h, it is immediately seen that during the positive half cycle of reference signal $\phi_{A\ REF}$ trigger pulses $T_1$, $T_2$ and $T_3$ are generated and therefore only rectifiers 190, 192 and 193 are turned on. Since these rectifiers have their respective anodes connected to converter means input terminals 67, 68 and 69, only positive pulses are passed when the rectifiers are triggered. These positive pulses provide the positive half cycle of the output power. Similarly, during the negative half cycle of reference signal $\phi_{A\ REF}$ only trigger pulses $T_4$, $T_5$ and $T_6$ are generated to turn on rectifiers 191, 193 and 195. These rectifiers have their respective cathodes connected to converter means input terminals 67, 68 and 69, and therefore provide negative pulses which make up the negative half cycle of the output power. Accordingly it is seen that the frequency of the output power from the converter depends only upon the reference signal and not on the frequency of the main generator voltage.

The synthesis of converter output power from the "chopped" fragments of main generator power can best be explained by reference to FIGS. 7h to 7l. The first trigger pulse of FIG. 7h is $T_3$ which turns on rectifier 194 having applied thereto the generator output voltage shown in FIG. 7k. FIG. 7k shows the time of application of trigger pulse $T_3$ by a vertical line marking the beginning of shaded area 200 and also the amount of current conducted once rectifier 194 is turned on. Current continues to flow through rectifier 194 until its voltage becomes insufficient to sustain the hold current. During the time rectifier 194 is conductive, electrical energy corresponding to the shaded volt-second area 200 is passed through converter means 194 to terminal 70. The pulse 200 of FIG. 7l shows the current flowing through terminal 70 in response to trigger pulse $T_3$.

The next pulse, according to FIG. 7h, is pulse $T_1$ which triggers rectifier 190 having impressed thereon $\phi_{A\ GEN}$, the A-phase of main generator 20. Just as before, FIG. 7i shows the time of application of trigger pulse $T_1$ and the current passed through rectifier 190 by shaded area 201. The current flowing through converter means output terminal 70 in response to trigger pulse $T_1$ is shown in FIG. 7l as pulse 201. The next trigger pulse, according to FIG. 7h, is pulse $T_2$ which turns on rectifier 192 to which $\phi_{B\ GEN}$ of main generator 20 is applied. The current flowing through rectifier 192 in response to pulse $T_2$ is shown as shaded area 202. This produces an output pulse 202 as shown in FIG. 7l. Similarly, output pulses 203 to 210 are sequentially provided at converter means output terminal 70 during the positive half cycle of the reference signal voltage.

During the negative half cycle of the reference voltage, trigger pulses $T_4$, $T_5$ and $T_6$ become available for turning on rectifiers 191, 193 and 195, as has already been explained. The first trigger pulse according to FIG. 7h is pulse $T_5$ which turns on rectifier 193 to pass current corresponding to shaded portion 211, and thereby produce output pulse 211 as shown in FIG. 7l. Similarly, output pulses 212 to 222 are obtained sequentially in the manner explained above. It can therefore be seen that this converter acts like a "straight through" converter which chops up all three phases generated by a main generator 20 in response to trigger pulses sequenced in accordance with the polarity and envelope of a reference signal.

As can easily be seen from FIG. 7l, converter means 64 provides a series of output pulses 200 to 222 of electrical energy which closely conform in their amplitude variations to one cycle of a sine wave having a frequency equal to the reference signal frequency. This series of output pulses is smoothed by choke 196 and thereafter passed through $\phi_A$ filter 73 in order to develop the smooth sine wave of $\phi_{A\ CON}$ shown in FIG. 7m.

Converter means 65 and 66 may be similar to converter means 64 and have applied thereto the three phases of the alternating current power from main generator 20. Trigger pulses for operating converter means 65 and 66 are provided by trigger means 56 and 57 respectively. Converter means 65 and 66 provide the remaining two phases $\phi_{B\ CON}$ and $\phi_{C\ CON}$ of the constant low frequency output power of the system.

The generating system described hereinabove discloses several noteworthy features. First, the frequency of the output power, one phase thereof being shown in FIG. 7m, depends entirely on the frequency of the reference signal since the reference signal determines whether trigger pulse set $T_1$, $T_2$ and $T_3$ or set $T_4$, $T_5$ or $T_6$ operate the modulating means. Trigger pulse set $T_1$, $T_2$ and $T_3$ provides the positive portion and trigger pulse set $T_4$, $T_5$ and $T_6$ provides the negative portion of the alternating current output. The duration of each set of trigger pulses is determined solely by the reference signal voltage. Hence, the frequency of the alternating current provided by main generator 20 may vary over wide limits without having any effect on the output frequency.

Second, the occurrence of trigger pulses necessarily takes place during the half cycles of main generator output voltage. As explained above, this is the case because the trigger pulses themselves are produced in response to the modulated half cycles of main generator output power. Accordingly, the frequency of the trigger pulses is independent of the reference signal and depends solely on the frequency of the main generator output power. More specifically, the main generator output voltage determines the frequency of the trigger pulses, and the reference signal voltage determines whether the generated trigger pulses will be utilized to control the synthesis of a positive or negative half cycle of the system output power.

Parenthetically, as will be explained hereinafter, trigger pulses derived from half cycles of main generator output power may be utilized in a constant firing angle system to trigger the various rectifiers a constant time interval after the application of cathode-anode voltage to the rectifiers. Also, in an alternative embodiment of this invention to be explained hereinafter, the utilization of a series of trigger pulses concurring with half cycles of main generator output power is not absolutely necessary. The rectifiers or other type of gating means may be turned on and left on during the time the reference voltage is positive and turned off at the time another set of gating means is turned on when the reference voltage becomes negative.

Third, the firing angle decreases as signal increases, and vice versa, so that the conduction time of the rectifiers during the half cycles of generator output power is regulated in a manner which contributes to the shaping of the sine wave output of the converter system. This is shown in FIG. 7l. To bring out the importance of utilizing a firing angle which varies with the modulation envelope, of the reference signal, it is instructive to consider another embodiment of this invention (not shown) which utilizes a constant firing angle. In accordance with this alternative embodiment, the positive group of rectifiers is turned on by the positive half cycle of the reference voltage and the negative group of rectifiers by the negative half cycle of the reference voltage. Or else, if a triggering signal of more intelligence is provided, as by controlling the generation of trigger pulses to occur in response to unmodulated half cycles of the generator output voltage, the rectifiers are turned on a fixed time interval after crossing the crossover point. The output of the converter means in these embodiments is essentially a square wave having a frequency determined by the reference frequency.

Two main problems are encountered with the aforementioned square-wave power generating systems. One problem is the uncertainty of the crossover point where the reference voltage passes through zero. Since it is one of the characteristics of rectifiers that after being turned on they remain on until the current flow therethrough falls below the hold current, it is possible for both the positive and negative groups to be turned on at the same time causing a line-to-line short. The other problem is that the resulting square wave is not as easily filtered as the series of pulses shown in FIG. 7*l* because a square wave contains a large number of harmonics. It is to eliminate problems such as these that the preferred embodiment of this invention utilizes trigger pulses having times of occurrence which make it possible to "chop" the main generator output wave into segments which vary in amplitude and energy content in accordance with a sine function.

Utilization of an amplitude modulated wave formed by modulating the main generator output voltage with the reference voltage, in conjunction with a saturable reactor to generate trigger pulses having leading edges varying in accordance with the amplitude of the reference voltage insures that the firing angle of the silicon controlled rectifiers will vary sinusoidally. In addition to this preferred embodiment of the invention, other means may be utilized to vary the position of the timing of the leading edges of the trigger pulses in accordance with the amplitude of the reference voltage.

For example, a different embodiment of this invention which provides trigger pulses having leading edges which occur during successive half cycles of the main generator output voltage at times determined by the amplitude of the reference signal envelope utilizes a saturable transformer instead of the saturable reactor and trigger pulse generator described above. The reference signal is mixed in a saturable transformer with a composite signal made up of portions of the main generator output voltage and the reference signal. In operation, the saturable transformer is at saturation at all times except when the algebraic sum of the ampere turns is effectively zero. At that instant the transformer becomes unsaturated, giving rise to a trigger pulse which is applied to the electrode of an associated silicon controlled rectifier. The train of triggering pulses generated by the saturable transformer has a frequency equal to the main generator frequency. The occurrence of the leading edges of the triggering pulses during half cycles of the main generator output voltage varies linearly with respect to the amplitude of the reference signal envelope.

Another embodiment of this invention wherein output wave shaping intelligence is imparted to the leading edge of the trigger pulses utilizes a bilateral circuit as a modulator instead of the modulator means described above. The high-frequency main generator output current is applied to a bilateral circuit, such as a bridge having diodes in its four branch arms. More particularly, the high frequency current is applied via a load impedance across the bridge junctions formed by the anode and cathode of the diodes, and low frequency reference signal current is applied across the other two bridge junction points. This arrangement provides an amplitude modulated alternating current across the load impedance similar to the output voltage of the modulator means used in the preferred embodiment of this invention. This amplitude modulated high frequency signal is then applied to a saturable reactor having a constant volt-second rating. The resulting trigger pulse has a leading edge whose time of occurrence during half cycles of the main generator output voltage varies sinusoidally with the amplitude of the modulating reference signal in the same manner as in the preferred embodiment.

A further embodiment of this invention for varying the leading edge of the trigger pulse with the reference signal envelope utilizes a flux reset type circuit. The output current from the flux reset circuit is a half-wave sinusoid with the leading edge absorbed by a saturable core. The voltage absorbed is dependent upon the amount of reset of the core flux as determined by the voltage applied to the reset winding.

Still other means for varying the leading edge of the trigger pulse in accordance with the envelope of the reference generator output voltage will become evident through the above teachings.

The power generating system described herein permits very wide variations of the main generator frequency. In fact the only limitation on the maximum main generator frequency is the time of response of the silicon controlled rectifiers, that is, the time necessary to turn them on by means of the leading edge of the trigger pulses and the time necessary to turn them off ofter the current therethrough drops below the hold current. Presently commercially available silicon controlled rectifiers have been tested and have been found entirely satisfactory up to 8000 cycles per second.

In a three-phase system in which a homopolar generator is utilized, such upper frequency limit corresponds to a rotor speed of 120,000 revolutions per minute, far in excess of most presently used turbine speeds. Constant improvements in silicon controlled rectifiers increase their frequency response so that for all practical purposes the upper limit of the main generator output frequency would be mechanical and not electrical in nature.

The lower frequency limit of the main generator output frequency is of greater importance since the generator starts from zero speed. It has been found that this lower frequency limit is determined by the frequency of the desired output power since in this "straight through" converter system the high frequency power is chopped at the reference frequency. If too few "chops" are made for one cycle of converter output power, there may be some unbalance between the positive and negative portion of the converter output power requiring considerable filtering and suppression of low order harmonics. Also, there may be cross-firing of the rectifiers if the forward biased rectifier does not cease to conduct prior to the firing of a rectifier in the group of opposite polarity.

It has been found that a frequency ratio of about four provides a smooth, easily-filtered output wave. Also, the magnitude of low order harmonics is negligible and cross-firing of the rectifiers does not occur. For example, if the desired output frequency from the converter is 60 cycles per second, the output power will be smooth if the frequency of the main generator is at least 240 cycles per second. This main generator output frequency for a three-phase power system corresponds to a rotor speed of 3600 revolutions per minute, a speed considerably lower than normal idling speed, and easily supplied by a starter motor during turn-on. Consequently, with available components, and in accordance with the foregoing example, the range through which the main generator speed may vary is from a low speed of 3600 to a high speed of 120,000 revolutions per minute. The high speed is 3,333 percent of the lower speed.

There has been described a power generating system in which power is generated by a main generator driven at a very high speed which may vary over very wide limits. The variable high frequency power is converted to a constant low frequency power by a "straight through" static converter. The frequency of the output power is independent of the frequency of the high speed generator output power and may be changed by changing the frequency of a reference generator. Consequently, the system may also be employed for generating high power at a low frequency which varies in some predetermined manner in accordance with the reference signal output of a reference signal generator.

What is claimed is:

1. A system for converting alternating current power of a variable high frequency to a preselected, constant low frequency, said system comprising: converter means including at least one pair of oppositely poled, controllable rectifier means connected to conduct current alternately in opposite directions between input and output terminals, each of said rectifier means having a control terminal and becoming conductive upon the application of a control signal to said control terminal, the alternating current power to be converted being applied to said input terminals and the converted alternating current power being received from said output terminals; reference generator means for providing a reference signal of a frequency equal to said preselected constant low frequency; and circuit means responsive to said reference signal and the high frequency alternating current power for developing a control signal for each half cycle of said high frequency alternating current power for application to said control terminals in such a manner that said rectifier means conduct alternately with change of polarity of said reference signal, the circuit means also including a constant volt-second means for providing firing angles for said control signals which vary with the amplitude of said reference signal.

2. A system for converting alternating current power of a high and variable frequency to power of constant, preselected low frequency, said system comprising: converter means including at least one pair of oppositely poled controllable rectifier means connected to conduct current alternately in opposite directions between input and output terminals, each of said rectifier means having a control terminal, the alternating current power to be converted being applied to said input terminals and the converted alternating current power being received from said output terminals; reference generator means for providing a reference signal of a frequency equal to said constant preselected low frequency; modulaor means including a first and a second modulator circuit for selectively amplitude modulating a signal corresponding to said reference power with said alternating current signal, said first and said second modulator circuits alternately providing an amplitude modulated control signal, said first modulator circuit including a pair of diodes held beyond cut-off by the negative half cycle of said reference signal, and said second modulator circuit including a pair of diodes held beyond cut-off by the positive half cycle of said reference signal; and first and second trigger means respectively connected to said first and second modulator circuits to develop trigger pulses for application to said control terminals.

3. A system for converting high, variable-frequency alternating current power to output power of a preselected constant, low frequency, said system comprising: converter means including at least one pair of oppositely poled, controllable rectifier means connected to conduct current alternately in opposite directions between input and output terminals, each of said rectifier means having a control terminal, the alternating current power to be converted being applied to said input terminals and the converted alternating current power being received from said output terminals; reference generator means for providing a reference signal of a frequency equal to said preselected, constant, low frequency; modulator means including first and second modulator circuits for selectively amplitude modulating a signal corresponding to said alternating current power with said reference signal, said first and said second modulator circuits alternately providing an amplitude modulated control signal, said first modulator circuit including a pair of diodes held beyond cut-off by the negative half cycle of said reference signal, and said second modulator circuit including a pair of diodes held beyond cut-off by the positive half cycle of said reference signal; first and second trigger means respectively connected to said first and second modulator circuits to develop a trigger pulse for application to said control terminals for each cycle of said alternating current power to be converted, the firing angle of said trigger pulses varying inversely as the intantaneous magnitude of said reference signal.

4. A three phase alternating current power generating system for delivering alternating current power at a preselected constant frequency, said system comprising: a three phase alternating current main generator for developing three phases of alternating current power at the main generator frequency; drive means for operating said main generator at high speed which may vary over a wide range; a converter means including three converter circuits each having three pairs of oppositely poled silicon controlled rectifiers, each of the three main generator phases being applied to one of said three pairs of rectifiers of each converter circuit; a three phase alternating current reference generator for developing three phases of alternating current signals at said preselected constant frequency; a modulator circuit means associated with each phase of said alternating current signal, each of said modulator circuit means being responsive to a different one of said alternating current signals and to all three phases of said alternating current power and operative to provide three pairs of amplitude modulated output signals, said three pairs of output signals comprising the three phases of the main generator modulated with the associated alternating current signal, each pair providing an output signal alternately in accordance with the polarity of said reference signal; and a pair of saturable reactors responsive to a pair of amplitude modulated output signals and operative to provide control signals for operating a pair of rectifiers of one of said three converter circuits, said control signals having a frequency equal to the main generator frequency and a firing angle varying inversely as the amplitude of alternating current signal.

5. In an electrical power generating system including a system output terminal and an alternator driven at varying speed by a prime mover to produce output power of varying frequenly, converter apparatus for changing the alternator output power into system output power of predetermined lower, constant frequency, the converter apparatus comprising:
   means for generating a reference frequency signal having a constant frequency lower than the alternator output frequency;
   means coupled to the alternator and to the generating means for producing trigger pulses during successive half cycles of the alternator output voltage in response to the reference signal and a portion of alternator output power;
   and controllable conductive means connected between the alternator and the system output terminal and selectively controllable in response to applied trigger pulses to pass to the system output terminal portions of the positive half cycles of alternator output voltage occurring during a period equal to one half cycle of the reference signal, and to pass to the system output terminal portions of the negative half cycles of alternator output voltage occurring during a period equal to the next half cycle of the reference signal.

6. In an electrical power generating system, converter apparatus as represented in claim 5 further including filtering means connected to the output of the controllable conductive means for smoothing said portions of the alternator output voltage passed by the controllable conductive means.

7. In an electrical power generating system including a system output terminal and an alternator driven at variable speed by a prime mover to produce output voltage and current of varying frequency, converter apparatus for changing the variable-frequency alternator output power into system output voltage and current equal in frequency to the lower, constant frequency of a reference signal, the converter apparatus comprising:
   means for generating a reference signal of constant frequency lower than the variable output frequency of the alternator;
   and first and second controllable conductive means connected between the alternator and the system output terminal and having a control terminal responsive to signals originated by the reference signal generating means for selectively conducting portions of the positive half cycles of alternator output current during a period equal to one half cycle of the reference signal, and for conducting portions of the negative half cycles of alternator output current during a period equal to the next half cycle of the reference signal.

8. In an electrical power generating system, converter apparatus as represented in claim 7 further comprising filtering means connected to receive the portions selectively conducted by the controllable conductive means for smoothing the wave form presented at said system output terminal.

9. A variable, high frequency-to-predetermined lower frequency power converter comprising:
    means for generating a reference signal of the predetermined constant lower frequency;
    modulating means coupled to the reference signal generator for mixing a simple of the variable, high-frequency power with the reference signal to produce an amplitude-modulated control signal;
    means coupled to the modulating means and responsive to the control signal for producing trigger pulses during successive half cycles of the current component of high variable-frequency power;
    and controllable conductive means having control terminals respectively connected to the trigger pulse producing means, the controllable conductive means being coupled to receive alternating, variable, high frequency power as an input and to develop an output in response to said trigger pulses consisting of predetermined portions of the positive half-cycles of variable, high frequency power occurring during one half-cycle of the reference signal and of predetermined portions of the negative half-cycles of the variable, high frequency power occurring during the next half-cycle of the reference signal.

10. In an electrical power generating system including a system output terminal and an alternator driven by a prime mover subject to fluctuations in speed to produce output power of varying frequency, converter apparatus for changing the frequency of the alternator output power to a predetermined lower, constant frequency, the converter apparatus comprising:
    a first controllable, unidirectionally-conductive device having a control terminal, an anode coupled to the alternator, and a cathode coupled effectively to the system output terminal;
    a second controllable, unidirectionally-conductive device having a control terminal, an anode coupled effectively to the system output terminal, and a cathode coupled to the alternator;
    means for generating a reference signal at said predetermined lower, constant frequency;
    means coupled to the reference signal generator and to the alternator, and responsive to the reference signal and at least a portion of the alternator output power, for producing alternately first and second periodic control signals having amplitude variations predetermined by the waveform of the reference signal;
    and a trigger circuit connected between the control signal producing means and the respective control terminals of the first and second unidirectionally-conductive devices for producing a first series of trigger pulses during one half cycle of the reference signal for triggering conduction in one of the first and second devices at varying times during half cycles of one polarity of the alternator voltage predetermined by one of the first and second amplitude-modulated control signals, and for producing a second series of trigger pulses during the next half cycle of the reference signal for triggering conduction in the other of the first and second devices at times during half cycles of the other polarity of the alternator voltage predetermined by the other of the first and second series of amplitude-modulated control signals.

11. In an electrical power generating system including a system output terminal and an alternator driven by a prime mover subject to fluctuations in speed to produce output power of varying frequency, converter apparatus for changing the frequency of the alternator output power to a predetermined lower, constant frequency, the converter apparatus comprising:
    a first controllable, unidirectionally-conductive device having a control terminal, an anode coupled to the alternator, and a cathode;
    a second controllable, unidirectionally-conductive device having a cathode coupled to the alternator, a control terminal, and an anode;
    means for generating a reference signal at said predetermined lower, constant frequency;
    first means coupled to the alternator, the reference-signal generator, and the control terminal of one of the first and second devices for controlling the latter to conduct during a period equal to one-half cycle of the reference signal, a series of positive components of alternator power for use in forming the positive half cycles of the system output current;
    second means coupled to the alternator, the reference signal generator, and the control terminal of the other of the first and second devices for controlling the latter to conduct, during a period equal to an alternate one-half cycle of the reference signal, a series of negative components of alternator power for use in forming the negative half cycles of the system output current;
    and filtering means coupled to the cathode of the first device, the anode of the second device and the system output terminal for smoothing the positive and negative components of alternating power to form an approximate sine waveform of system output voltage and current equal in frequency to the reference signal.

12. In an electrical power generating system, converter apparatus as represented in claim 10 wherein the trigger circuit further includes means for varying the times of occurrence of the trigger pulses during successive positive half cycles of the alternator voltage in accordance with the amplitude of the waveform of the reference signal.

13. In a three-phase power generating system for developing output power at a preselected constant frequency, and including an alternator normally developing three-phase output power at a frequency extending from a lower limit substantially greater than said system output frequency, converter apparatus comprising:
    three converter channels coupled to the alternator, each having three pairs of oppositely-poled, silicon controlled rectifiers connected respectively to receive a separate phase of the alternator output power;
    a three-phase reference signal generator for developing a three-phase reference signal at said preselected constant frequency;
    three modulators coupled to the reference signal generator, and to the alternator, and responsive to a different phase of said reference signal and to all three phases of said alternating current power to provide three pairs of amplitude-modulated control signals, each pair providing a control signal alternately in accordance with the polarity of said reference signal;
    and a pair of saturable reactors coupled to each modulator and operative to provide alternate series of trigger pulses in response to the alternate control signals, whereby one of the trigger pulses occurs during each half cycle of the voltage component of alternator output power.

14. In an electrical power generating system including a system output terminal and an alternator driven by a prime mover subject to fluctuations in speed to produce output power of varying frequency, converter apparatus for changing the frequency of the alternator output power to a predetermined lower, constant frequency, the converter apparatus comprising:

a first controllable, unidirectionally-conductive device having a control terminal, an anode coupled to the alternator, and a cathode coupled effectively to the system output terminal;

a second controllable, unidirectionally-conductive device having a control terminal, an anode coupled effectively to the system output terminal, and a cathode coupled to the alternator;

means for generating a reference signal at said predetermined lower, constant frequency;

means coupled to the reference signal generator and to the alternator, and responsive to the reference signal and at least a portion of the alternator output power, for producing a control signal having amplitude variations in accordance with the waveform of the reference signal;

and means coupled to the control-signal producing means and to the respective control terminals of the first and second unidirectionally-conductive devices for producing a first series of pulses during one half cycle of the reference signal for triggering conduction in one of the first and second devices at varying times during half cycles of alternator voltage predetermined by the amplitude modulated control signal, and for producing a second series of pulses during the next half cycle of the reference signal for triggering conduction in the other one of the first and second devices at varying times during half cycles of alternator voltage predetermined by the amplitude-modulated control signal.

15. In an electrical power generating system including a system output terminal and an alternator driven at variable speed by a prime mover to produce output voltage and current of varying frequency, converter apparatus for changing the variable-frequency alternator output power into system output voltage and current equal in frequency to the lower, constant frequency of a reference signal, the converter apparatus comprising:

means for generating a reference signal of constant frequency lower than the variable output frequency of the alternator;

means coupled to the alternator and to the system output terminal for conducting portions at least of the positive half cycles of alternator output current during a period equal to one half cycle of the reference signal, and for conducting portions at least of the negative half cycles of alternator output current during a period equal to the next half cycle of the reference signal;

means coupled to the alternator, to the reference signal generator, and to the conducting means for predetermining the conduction periods of the latter;

and means coupled to the conduction means and the system output terminal for synthesizing from the conducted portions of alternator output power continuous waveforms of system output voltage and current.

16. In an electrical power generating system including a system output terminal and an alternator driven at variable speed by a prime mover to produce output voltage and current of varying frequency, converter apparatus for changing the variable-frequency alternator output power into system output voltage and current equal in frequency to the lower, constant frequency of a reference signal, the converter apparatus comprising:

means for generating a reference signal of constant frequency lower than the variable output frequency of the alternator;

means coupled to the alternator and to the system output terminal for conducting portions at least of the positive half cycles of alternator output current during a period equal to one half cycle of the reference signal, and for conducting portions at least of the negative half cycles of alternator output current during a period equal to the next half cycle of the reference signal;

means coupled to the alternator, to the reference signal generator, and to the conducting means for predetermining respective lengths of the conduction periods of the latter in accordance with a function at least approximating the desired waveform of the system output voltage and current;

and means coupled between the conduction means and the system output terminal for synthesizing from the conducted portions of alternator output power continuous waveforms of system output voltage and current.

17. In an electrical power generating system, converter apparatus as represented in claim 16 wherein the predetermining means comprises means for predetermining the respective lengths of the conduction periods of the conducting means in accordance with the amplitude of said reference signal.

References Cited by the Examiner

UNITED STATES PATENTS

| | | | |
|---|---|---|---|
| 2,456,494 | 12/1948 | Ensink | 332—43 |
| 2,899,566 | 8/1959 | Ware et al. | 321—61 |
| 2,905,832 | 9/1959 | Sargeant | 321—4 |
| 2,967,252 | 1/1961 | Blake | 321—61 |
| 2,995,696 | 8/1961 | Stratton et al. | 321—69 |
| 3,054,940 | 9/1962 | Chirgwin et al. | 321—69 |
| 3,089,992 | 5/1963 | Seney | 321—4 |
| 3,129,381 | 4/1964 | Manteuffel | 323—22 X |
| 3,151,286 | 9/1964 | Berman et al. | 323—22 X |
| 3,152,297 | 10/1964 | Peaslee | 321—61 |
| 3,170,107 | 2/1965 | Jessee | 321—61 |

LLOYD McCOLLUM, *Primary Examiner.*

G. J. BUDOCK, J. C. SQUILLARO, G. GOLDBERG, *Assistant Examiners.*

Notice of Adverse Decision in Interference

In Interference No. 95,865 involving Patent No. 3,256,244, R. C. Byloff and J. Chun, ALTERNATING CURRENT POWER GENERATING SYSTEM, final judgment adverse to the patentees was rendered Dec. 14, 1971, as to claims 5, 6, 7, 8, 11, 15, 16 and 17.

[*Official Gazette October 31, 1972.*]